United States Patent
Tang et al.

(10) Patent No.: US 7,970,544 B2
(45) Date of Patent: Jun. 28, 2011

(54) METHOD AND APPARATUS FOR CHARACTERIZING AND ESTIMATING PERMEABILITY USING LWD STONELEY-WAVE DATA

(75) Inventors: Xiao Ming Tang, Sugar Land, TX (US); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 680 days.

(21) Appl. No.: 11/768,807

(22) Filed: Jun. 26, 2007

(65) Prior Publication Data
US 2009/0005995 A1    Jan. 1, 2009

(51) Int. Cl.
*G01V 1/50* (2006.01)
*G01V 1/00* (2006.01)
*G01V 1/24* (2006.01)
*G01V 1/28* (2006.01)
*G01V 1/40* (2006.01)
*G01V 1/46* (2006.01)
*G01V 1/48* (2006.01)
*G06F 19/00* (2006.01)
*G06F 17/40* (2006.01)

(52) U.S. Cl. ............ 702/11; 73/152.01; 73/152.02; 73/152.03; 73/152.05; 73/152.47; 166/250.01; 175/50; 181/102; 340/856.3; 340/856.4; 367/14; 367/25; 702/2; 702/6; 702/187

(58) Field of Classification Search .......... 73/152.01, 73/152.02, 152.03, 152.05, 152.47; 166/244.1, 166/250.01, 250.02; 175/40, 50; 181/101, 181/102; 324/323; 340/853.1, 856.3, 856.4; 367/14, 25, 81, 82, 86; 702/1, 2, 6, 11, 127, 702/187, 189
See application file for complete search history.

(56) References Cited

U.S. PATENT DOCUMENTS

| | | | | |
|---|---|---|---|---|
| 3,390,377 A | * | 6/1968 | Elliot et al. .......... | 367/75 |
| 4,797,859 A | | 1/1989 | Hornby .............. | 367/31 |
| 4,813,028 A | * | 3/1989 | Liu .................. | 367/31 |
| 4,890,487 A | | 1/1990 | Dussan et al. ....... | 73/152 |
| 4,964,101 A | * | 10/1990 | Liu et al. ............ | 367/31 |
| 5,265,016 A | * | 11/1993 | Hanson et al. ....... | 702/18 |
| 5,687,138 A | * | 11/1997 | Kimball et al. ...... | 367/31 |

(Continued)

FOREIGN PATENT DOCUMENTS

EP    0 46 101 A2 *    7/1981

(Continued)

OTHER PUBLICATIONS

Chuen Hon Cheng et al.; *Determination of In Situ Attenuation From Full Waveform Acoustic Logs*, Journal of Geophysical Research, vol. 87, No. B7, Jul. 10, 1982, pp. 5477-5484, 11 Figs.

(Continued)

*Primary Examiner* — Edward R Cosimano
(74) *Attorney, Agent, or Firm* — Mossman Kumar & Tyler PC (57) ABSTRACT

Stoneley-wave data acquired in the LWD environment are used to characterize/estimate formation permeability. Real-time Stoneley-wave time-delay/slowness and center-frequency/attenuation data are used to indicate/characterize formation permeability even during drilling. The use of stabilizers mounted at the tool ends helps maintain the tool position from severe decentralization, reducing ambiguities in the permeability characterization/estimation.

22 Claims, 8 Drawing Sheets

(5 of 8 Drawing Sheet(s) Filed in Color)

U.S. PATENT DOCUMENTS

| | | | | |
|---|---|---|---|---|
| 5,708,204 | A * | 1/1998 | Kasap | 73/152.52 |
| 5,784,333 | A | 7/1998 | Tang et al. | 367/30 |
| 6,082,484 | A | 7/2000 | Molz et al. | 181/102 |
| 6,327,538 | B1 * | 12/2001 | Chin | 702/18 |
| 6,615,949 | B1 | 9/2003 | Egerev et al. | 181/102 |
| 6,714,480 | B2 * | 3/2004 | Sinha et al. | 367/31 |
| 6,915,875 | B2 | 7/2005 | Dubinsky et al. | 181/102 |
| 7,286,939 | B2 * | 10/2007 | Bachrach et al. | 702/14 |
| 2003/0167835 | A1 * | 9/2003 | Sinha et al. | 73/152.16 |
| 2006/0212225 | A1 * | 9/2006 | Bachrach et al. | 702/14 |
| 2006/0235617 | A1 | 10/2006 | Sinha et al. | |
| 2006/0285437 | A1 * | 12/2006 | Sinha et al. | 367/37 |
| 2009/0145600 | A1 * | 6/2009 | Wu et al. | 166/250.02 |

FOREIGN PATENT DOCUMENTS

| | | | |
|---|---|---|---|
| WO | 2004081343 | A1 | 9/2004 |
| WO | 2006033661 | A1 | 3/2006 |
| WO | WO 2007/001746 | A1 * | 1/2007 |

OTHER PUBLICATIONS

M. A. Biot; *Theory of Propagation of Elastic Waves in a Fluid-Saturated Porous Solid. I. Low-Freqnency Range*, The Journal of the Acoustical Society of America, vol. 28, No. 2, Mar. 1956, pp. 168-178, 6 Figs.

M. A. Biot; *Theory of Propagation of Elastic Waves in a Fluid-Saturated Porous Solid. II. High Freqnency Range*, The Journal of the Acoustical Society of America, vol. 28, No. 2, Mar. 1956, pp. 179-191, 18 Figs.

B. Joyce et al.; *Introduction of aNew Omni-directional Acoustic System for Improved Real-Time LWD Sonic Logging—Tool Design and Field Test Results*, SPWLA 42nd Annual Logging Symposium, Jun. 17-20, 2001, pp. 1-14, 15 Figs.

X. M. Tang et al.; *Estimating Formation Permeability and Anistoropy From Borehole Stoneley Waves*, SPWLA 45th Annual Logging Symposium, Jun. 6-9, 2004, pp. 1-14, 12 Figs.

A. N. Norris; *The spead of a tube wave*, J. Acoust. Soc. Am. 87(1), Jan. 1990, pp. 414-417.

X.M. Tang et al.; *Shear-Velocity Measurement in the Logging-While-Drilling Environment: Modeling and Field Evaluations*, Petrophysics, vol. 44, No. 2 (Mar.-Apr. 2003), pp. 79-90, 5 Figs., Tables.

David Linton Johnson et al.; *Theory of dynamic permeability and tortuosity in fluid-saturated porous media*, J. Fluid Mech. (1987), vol. 176, pp. 379-402, 3 Figs.

X.M. Tang et al.; *Development of a Low-Frequency Quadrupole Shear-Wave Technology to Improve Quality of LWD Shear Velocity Measurement*, SPE 102335, 2006 SPE Annual Technical Conference and Exhibition, San Antonio, Texas Sep. 24-27, 2006, pp. 1-11, 8 Figs.

Rosenbaum, J.H., "Synthetic Microseismograms: Logging in Porous Formations," Geophysics, vol. 39, No. 1, pp. 14-32, Feb. 1974.

Schmitt, D.P. et al., "Full-wave synthetic acoustic logs in radially semi-infinite saturated porous media," Geophysics, vol. 53, No. 6, pp. 807-823, Jun. 1988.

Tang, X. et al., "Borehole Stoneley wave propagation across permeable structures," Geophysical Prospecting, vol. 41, pp. 165-187, XP 002577356, Feb. 1, 1993.

Tang, X. et al., "Fast inversion of formation permeability from Stoneley wave logs using a simplified Biot-Rosenbaum model," Geophysics, vol. 61, No. 3, pp. 639-645, May-Jun. 1996.

Tang, X., "Determining formation shear-wave transverse isotropy from borehole Stoneley-wave measurements," Geophysics, vol. 68, No. 1, pp. 118-126, XP002577355, Jan.-Feb. 2003.

Huang, Xiaojun et al., "Effects of Tool Eccentricity on Acoustic Logging While Drilling (LWD) Measurements," SEG Int'l Exposition and 74th Annual Meeting, Denver, CO., pp. 1-4, XP002577354, Oct. 10-15, 2004.

Zheng, Y. et al., "A finite element analysis of the effects of tool eccentricity on wave dispersion properties in borehole acoustic logging while drilling," 4 pp., SEG Int'l Exposition and 74th Annual Meeting, Denver, CO, Oct. 10-15, 2004.

* cited by examiner

METHOD AND APPARATUS FOR CHARACTERIZING AND ESTIMATING PERMEABILITY USING LWD STONELEY-WAVE DATA

BACKGROUND OF THE DISCLOSURE

1. Field of the Disclosure

The present disclosure pertains to logging while drilling apparatus, and more particularly, to an acoustic logging while drilling apparatus for determination of formation permeability.

2. Summary of the Related Art

The permeability of a reservoir is an important quantity to know as it is one of the factors determining the rate at which hydrocarbons can be produced from the reservoir. Historically, two types of measurements have been used for determination of permeability. In the so-called drawdown method, a probe on a downhole tool in a borehole is set against the formation. A measured volume of fluid is then withdrawn from the formation through the probe. The test continues with a buildup period during which the pressure is monitored. The pressure measurements may continue until equilibrium pressure is reached (at the reservoir pressure). Analysis of the pressure buildup using knowledge of the volume of withdrawn fluid makes it possible to determine the permeability.

In the so-called buildup method, fluid is withdrawn from the reservoir using a probe and the flow of fluid is terminated. The subsequent buildup in pressure is measured and from analysis of the pressure, a formation permeability is determined. See, for example, U.S. Pat. No. 5,708,204 to Kasap, U.S. Pat. No. 7,181,960 to Shen et al., and U.S. Pat. No. 4,890,487 to Dassan et al.

The shut-in and build-up methods are time-consuming and require shut-down of the well for extensive periods of time. For this reason, acoustic wireline measurements have been used to estimate formation permeability. See, for example, Tang and Chen (Geophysics 1990), U.S. Pat. No. 4,797,859 to Hornby, and U.S. Pat. No. 5,784,333 to Tang et al.

Wireline measurements of formation permeability suffer from the possible effects of invasion of permeable zones during drilling operations by borehole mud. The present disclosure addresses this issue by using an acoustic logging while drilling (LWD) to estimate formation permeability during drilling.

SUMMARY OF THE DISCLOSURE

One embodiment of the disclosure is an apparatus for determining a permeability of an earth formation. The apparatus includes a logging tool configured to be conveyed in a borehole on a drilling tubular, an acoustic transmitter on the logging tool configured to generate a Stoneley wave in an annulus between the logging tool and a wall of the borehole, an array of acoustic receivers configured to generate signals responsive to the generated Stoneley wave, and a processor configured to process the generated signals using a model derived from a formation compressional wave velocity, a formation shear wave velocity, and a formation density to estimate the permeability of the earth formation. The processor is further configured to record the estimated permeability on a suitable medium. The apparatus may further include a first stabilizer at a first end of the logging tool and a second stabilizer at a second end of the logging tool, the first and second stabilizers configured to maintain the logging tool in a substantially centralized position in the borehole during rotation of the drilling tubular. The acoustic transmitter is configured to operate in a monopole mode at a frequency of between 0.2 kHz and 10 kHz. The processor may be further configured to estimate the permeability by determining a value of the formation permeability in the model which produces a Stoneley wave spectrum which substantially matches a Stoneley spectrum derived from the signals, and/or a Stoneley wave that has a time delay which substantially matches a Stoneley wave time delay derived from the signals. The processor may be further configured to estimate a frequency shift/or a time delay of the generated Stoneley wave relative to an output of the model with zero permeability. The processor may be configured to estimate the permeability by performing a slowness-time-coherence analysis and/or a velocity-frequency-coherence analysis. The apparatus may further include an acoustic isolator configured to attenuate an acoustic signal propagating along a body of the logging tool. The apparatus may further include at least one formation evaluation sensor configured to determine the formation compressional wave velocity, the formation shear velocity and/or the formation density. The receiver array may be positioned between the transmitter and a drillbit.

Another embodiment of the disclosure is a method of determining a permeability of an earth formation. The method includes conveying a logging tool in a borehole on a drilling tubular, activating an acoustic transmitter and generating a Stoneley wave in an annulus between the logging tool and a wall of the borehole, using an array of acoustic receivers to generate signals responsive to be generated Stoneley wave, processing the generated signals using a model derived from a formation compressional wave velocity, a formation shear wave velocity, and a formation density to estimate a permeability of the earth formation, and recording the estimated permeability on a suitable medium. The method may further include maintaining the logging tool in a substantially centralized position in the borehole during rotation of the drilling tubular. The method may further include operating the acoustic transmitter in a monopole mode at a frequency of between 0.5 kHz and 10 kHz. The permeability may be estimated by determining a value of the formation permeability in the model which produces a Stoneley wave spectrum which substantially matches the Stoneley wave spectrum derived from the signals and/or a Stoneley wave that has a time delay which substantially matches a Stoneley wave time delay derived from the signals. The method may further include estimating a frequency shift of the generated Stoneley wave relative to an output of the model with zero permeability. The method may also include estimating a time delay of the generated Stoneley wave relative to an output of the model with zero permeability. Estimating the permeability may be done by performing a slowness-time-coherence analysis and/or a velocity-frequency-coherence analysis. The method may further include using an acoustic isolator to attenuate an acoustic signal propagating along a body of the logging tool. The method may also include determining the formation compressional wave velocity, the formation shear wave velocity and the formation density using formation evaluation sensors. The method may further include estimating the permeability by using a relationship of the form:

$$k = \sqrt{k_e^2 + \frac{2i\rho_{pf}\omega\kappa(\omega)R}{\eta(R^2 - a^2)} \sqrt{-i\omega/D + k_e^2} \frac{K_1\left(R\sqrt{-i\omega/D + k_e^2}\right)}{K_0\left(R\sqrt{-i\omega/D + k_e^2}\right)}}$$

where ω is the angular frequency, R and a are borehole and tool radii respectively, D is a dynamic pore fluid diffusivity, and k(ω) is dynamic permeability; $\rho_{pf}$ and η are pore fluid density and viscosity respectively. $K_0$ and $K_1$ are modified Bessel functions of the second kind of orders zero and one respectively; and $k_e$ is the Stoneley wavenumber for the impermeable porous formation.

Another embodiment of the disclosure is a computer-readable medium for use with an apparatus for determining a permeability of an earth formation. The apparatus includes a logging tool configured to be conveyed in a borehole on a drilling tubular, an acoustic transmitter configured to generate a Stoneley wave in an annulus between the logging tool and a wall of the borehole, and an array of acoustic receivers configured to generate signals responsive to the generated Stoneley wave. The medium includes instructions which enable a processor to process the generated signals using a model derived from a formation compressional wave velocity, a formation shear wave velocity, and a formation density to estimate a permeability of the earth formation, and to record the estimated permeability on a suitable medium. The medium may include a ROM, an EPROM, an EAROM, a flash memory, and/or an optical disk.

BRIEF DESCRIPTION OF THE FIGURES

The patent or application file contains at least one drawing executed in color. Copies of this patent or patent application publication with color drawing(s) will be provided by the Office upon request and payment of the necessary fee. For detailed understanding of the present disclosure, reference should be made to the following detailed description of exemplary embodiment(s), taken in conjunction with the accompanying drawings, in which like elements have been given like numerals, wherein.

DETAILED DESCRIPTION OF THE EMBODIMENTS

In view of the above, the present disclosure through one or more of its various aspects and/or embodiments is presented to provide one or more advantages, such as those noted below.

Figure 1:
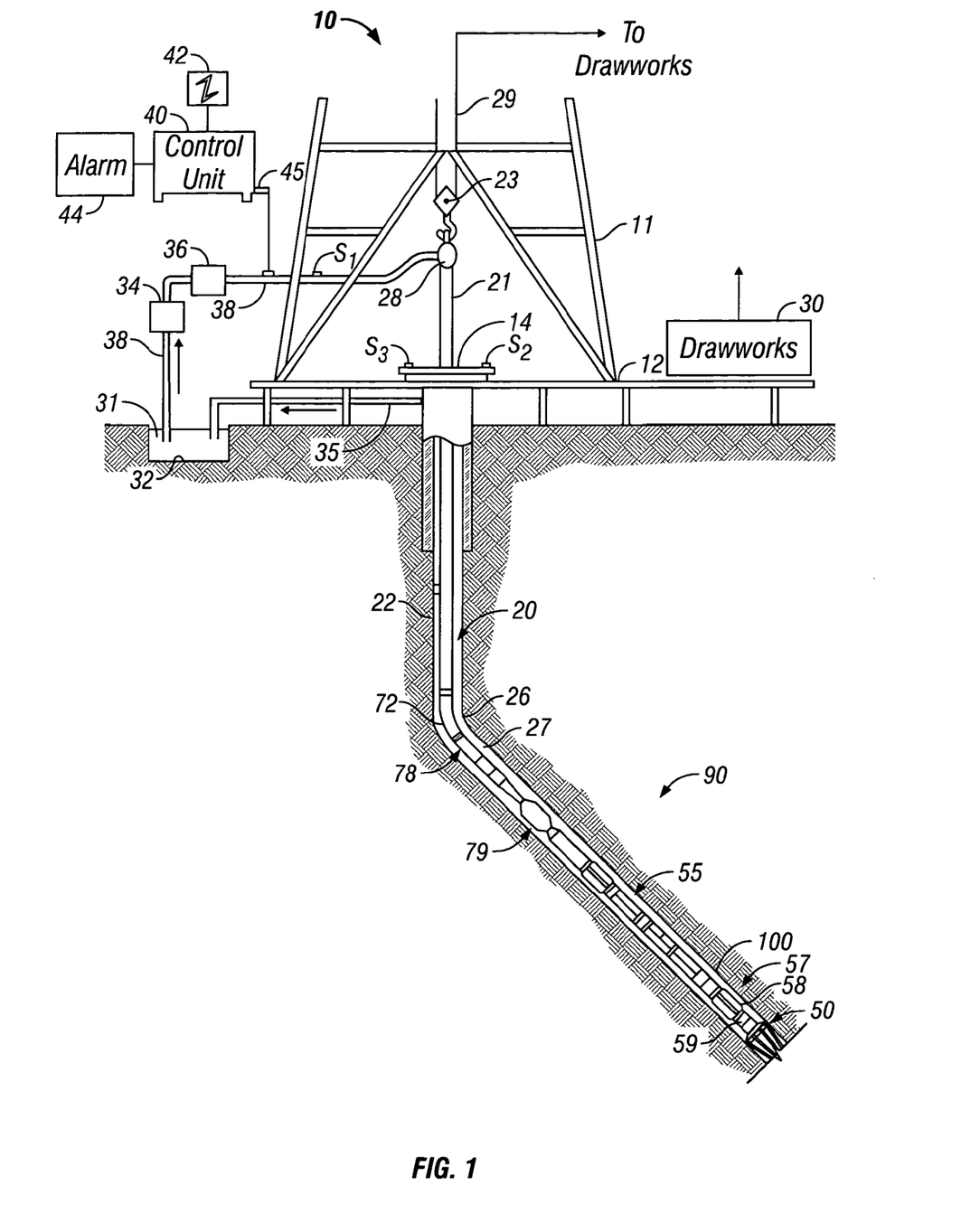
FIG. 1 is an illustration of a bottomhole assembly (BHA) deployed in a borehole from a drilling tubular that includes the apparatus according to one embodiment of the present disclosure.

FIG. 1 illustrates a schematic diagram of an MWD drilling system 10 with a drill string 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drill string 20 includes tubing such as a drill pipe 22 or a coiled-tubing extending downward from the surface into the borehole 26. The drill string 20 is pushed into the wellbore 26 when a drill pipe 22 is used as the tubing. For coiled-tubing applications, a tubing injector (not shown), however, is used to move the tubing from a source thereof, such as a reel (not shown), into the wellbore 26. The drill bit 50 attached to the end of the drill string 20 breaks up the geological formations when it is rotated to drill the borehole 26. If a drill pipe 22 is used, the drill string 20 is coupled to a drawworks 30 via a Kelly joint 21, swivel 28 and line 29 through a pulley 23. During drilling operations, the drawworks 30 is operated to control the weight on bit, a parameter that affects the rate of penetration. The operation of the drawworks is well known in the art and is thus not described in detail herein.

During drilling operations, a suitable drilling fluid 31 from a mud pit (source) 32 is circulated under pressure through a channel in the drill string 20 by a mud pump 34. The drilling fluid passes from the mud pump 34 into the drill string 20 via a desurger 36, fluid line 38 and Kelly joint 21. The drilling fluid 31 is discharged at the borehole bottom 51 through openings in the drill bit 50. The drilling fluid 31 circulates uphole through the annular space 27 between the drill string 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drill string 20 respectively provide information about the torque and rotational speed of the drill string. Additionally, a sensor (not shown) associated with line 29 is used to provide the hook load of the drill string 20.

Rotating the drill pipe 22 rotates the drill bit 50. Also, a downhole motor 55 (mud motor) may be disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor 55 rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

A drilling sensor module 59 is placed near the drill bit 50. The drilling sensor module 59 contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module 59 processes the sensor information and transmits it to the surface control unit 40 via the telemetry system 72.

The communication sub 72, a power unit 78 and an NMR tool 79 may be connected in tandem with the drill string 20. Flex subs, for example, are used in connecting the MWD tool 79 in the drilling assembly 90. Such subs and tools form the bottom hole drilling assembly 90 between the drill string 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals may be processed using a downhole processor in the drilling assembly 90.

The surface control unit or processor 40 also receives signals from other downhole sensors and devices, signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur. An acoustic logging tool 100 (discussed next) may be positioned at a suitable location such as shown.

Figure 2:
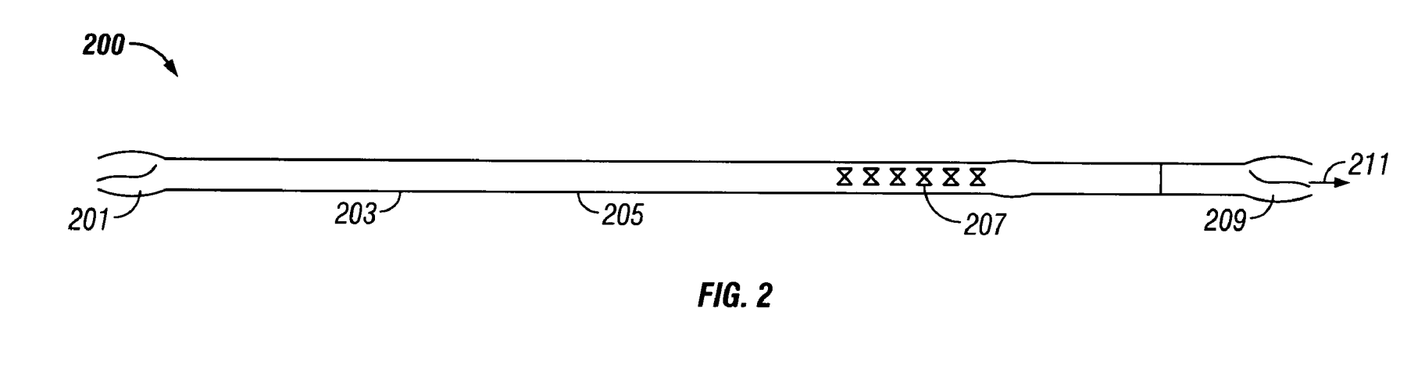
FIG. 2 is an illustration of a LWD acoustic tool mounted with stabilizers.

Turning now to FIG. 2, an exemplary tool 200 using the method of the present disclosure is illustrated. The logging tool includes an acoustic transmitter 203 and an array of acoustic receivers designated by 207. An acoustic isolator 205 is used to attenuate signals from the transmitter to the receiver array that propagate directly through the tool. See, for example, U.S. Pat. No. 6,082,484 to Molz et al., U.S. Pat. No. 6,615,949 to Egerev et al., U.S. Pat. No. 6,915,875 to Dubinsky et al., having the same assignee as the present disclosure and the contents of which are incorporated herein by reference. The drillbit is in the direction indicated by 211. The logging tool is also provided with stabilizers 201, 209, the necessity for which is discussed below.

Acoustic logging in a permeable porous formation has been studied by many authors. See, for example, Rosenbaum (1974) and Tang and Cheng. Existing analyses, however, address the wireline situation where the logging tool occupies only a small portion of the borehole. In many of the analyses, the presence of the logging tool is even neglected. For modeling the LWD acoustic propagation with a porous formation, the presence of the tool must be included because, the large-sized LWD tool substantially influences the wave propagation characteristics. For modeling the Stoneley waves that are monopole waves dominant in the low-frequency range, the effect of the isolator is neglected. Stabilizers mounted at the both ends of the tool help maintain the tool position in a centralized position during drilling. As will be discussed later, maintaining the tool position to avoid severe tool decentralization is important for the permeability measurement.

Figure 3:
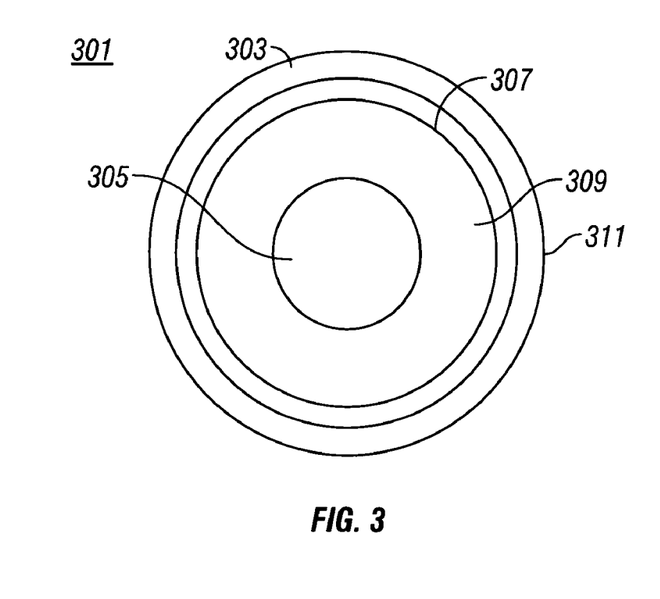
FIG. 3 is an illustration showing the acoustic model of a porous formation used to simulate acoustic wave propagation.

The LWD acoustic model with a porous formation is also shown in FIG. 3. Shown therein is a formation 301 with a borehole 311, drill collar 309 with a ring acoustic transducer 307. The annulus between the drill collar and the borehole wall is denoted by 303, while 305 denotes the fluid channel inside the drill collar. Acoustic propagation in the porous formation is formulated using Biot's poroelastic wave theory (*Biot*, 1956a; 1956b) and the boundary condition at the borehole-formation interface is assumed "open" to allow free hydraulic exchange between borehole and formation (Tang and Cheng). The "open" boundary condition simulates a permeable formation. For comparison purposes, the "sealed" borehole boundary condition is also used to simulate an impermeable porous formation (Schmitt et al., 1988). The impermeable formation is equivalent to an elastic formation, with elastic parameters equivalent to those of the fluid saturated porous formation. The permeable and impermeable results are compared to indicate the effects of permeability.

The acoustic model parameters are listed in Table I.

TABLE I

| Acoustic model | | | | |
|---|---|---|---|---|
| | $\Delta t_p$ (µs/ft) | $\Delta t_s$ (µs/ft) | $\rho$(g/cm$^3$) | Radius (in.) |
| Inner fluid | 200 | | 1.0 | 1.06 |
| Drill collar | 52 | 97.4 | 7.8 | 3.51 |
| Outer fluid | 200 | | 1.0 | 4.25 |
| Porous formation | 68 | 133 | 2.6 | |
| Porosity 0.25 | | | | |
| Permeability 1D | | | | |
| Fluid viscosity 1 cp | | | | |

The LWD tool has a 6.75-in diameter and is centered in an 8.5-in diameter borehole. The transmitter source is modeled by placing a monopole ring source at the rim of the tool. The modeled acoustic waveform is recorded by an array of receivers disposed longitudinally at the rim of the tool with a receiver-to-receiver spacing of 0.75 ft.

To compare the similarity and difference between the wireline and LWD scenarios, we first model the wireline scenario and use it as a basis for the comparison. As indicated in Table I, the formation for this modeling is a fast formation (the shear velocity in the formation is greater than the compressional velocity in the borehole fluid) with 25% porosity and 1-Darcy permeability, saturated with water (viscosity=1 cp). In modeling the wireline scenario, the LWD tool is removed from the model. To demonstrate the effects of permeability, the modeling results are shown for impermeable (sealed borehole) and permeable borehole wall conditions.

Figure 4A:
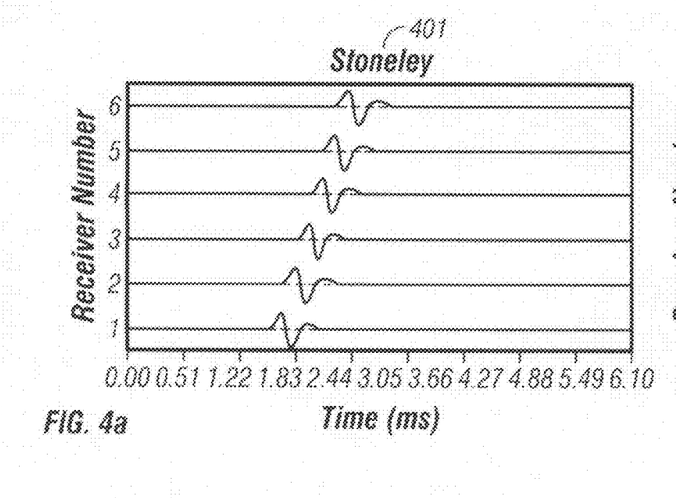
FIGS. 4a, 4b, 4c and 4d show simulated wireline array monopole-wave data for a 3-kHz source for an impermeable formation. The four plots of this figure show, respectively: (a) 3-kHz Stoneley wave; (b) wave spectrum; (c) semblance correlogram contour from the STC processing; and (d) velocity-frequency-coherence display from the dispersion analysis of the wave.
Figure 4B:
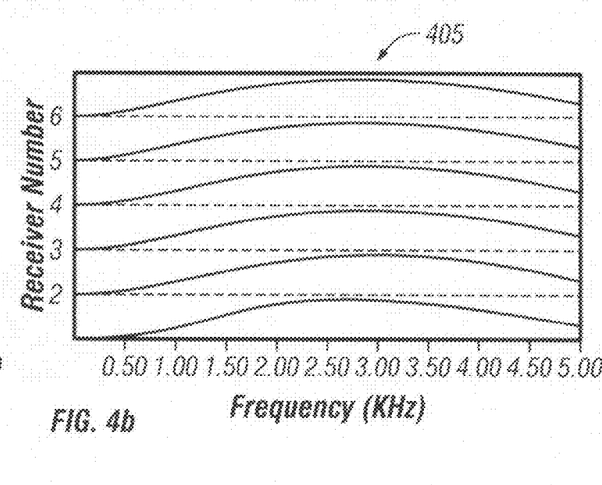
Figure 4C:
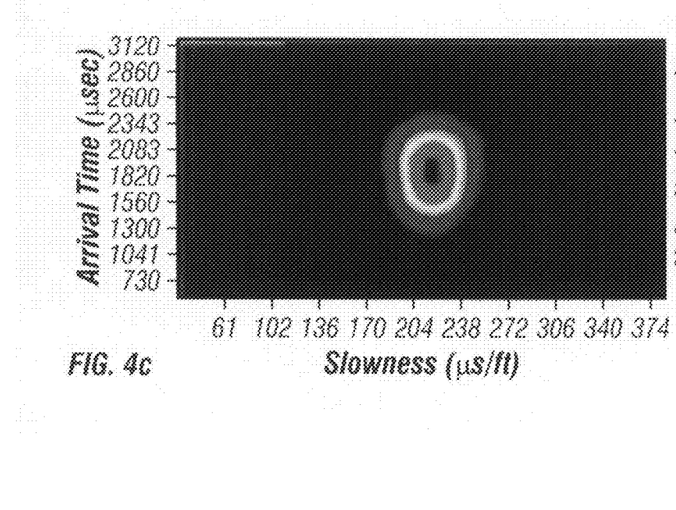
Figure 4D:
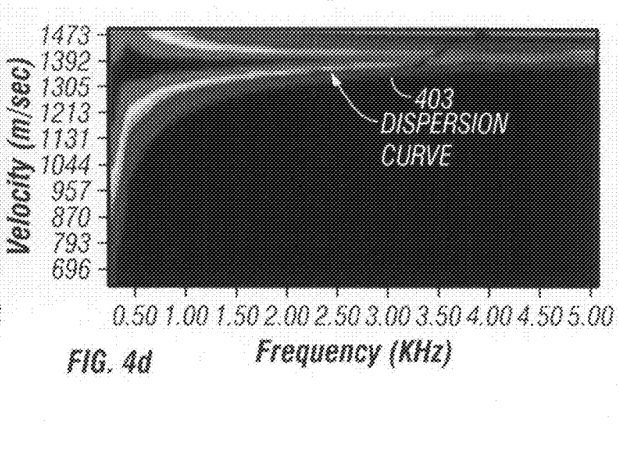

FIGS. 4a, 4b, 4c and 4d are the modeling result for the impermeable borehole condition. For an acoustic source of 3-kHz center frequency, the simulated waveforms and their amplitude spectra for the six-receiver array along the tool are respectively shown in FIG. 4a and FIG. 4b. The abscissa of the display in FIG. 4a is time while in FIG. 4b, it is frequency. The waveform shows mainly the Stoneley wave 401 in this low-frequency wave. A straightforward velocity/slowness analysis using the semblance method gives the correlogram image plot (called Slowness-Time-Coherence, or STC, display). The abscissa in FIG. 4c is slowness (reciprocal of velocity) and the ordinate is the intercept time. As seen in FIG. 4c, the peak of the correlogram corresponds to the moveout slowness of the wave across the receiver array. The frequency dependence of the wave velocity, or dispersion, can be seen from the dispersion analysis result for the array waveform data, as shown by an image display (called Velocity-Frequency-Coherence, or VFC, display) in FIG. 4d, where the abscissa is frequency and the ordinate is velocity. In this analysis, the wave phase coherence for various moveout velocity values across the array is calculated for each frequency, with the peak coherence corresponding to the phase velocity of a wave mode. Thus the high-coherence trend (central part 403 of the bright area) versus frequency in the VFC image display delineates the frequency-dependent characteristics of the wave mode's phase velocity. In the frequency range of 0-5 kHz, the wave's velocity increases only slightly with frequency. The center frequency is generally indicated by 405.

Figure 5A:
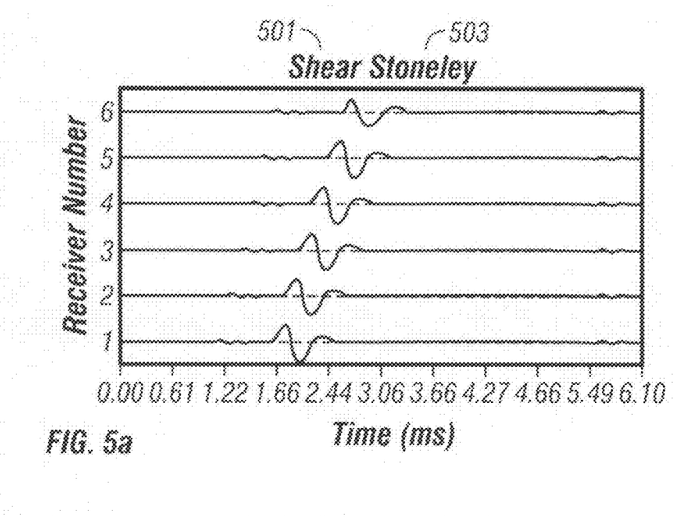
FIGS. 5a, 5b, 5c and 5d show results similar to those of FIG. 4 for a permeable formation.
Figure 5B:
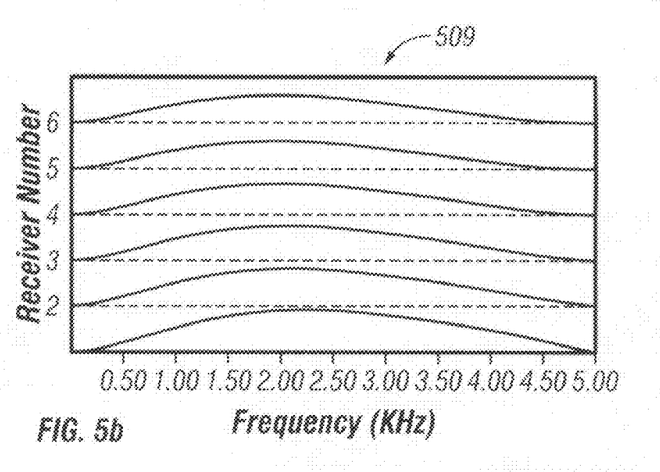
Figure 5C:
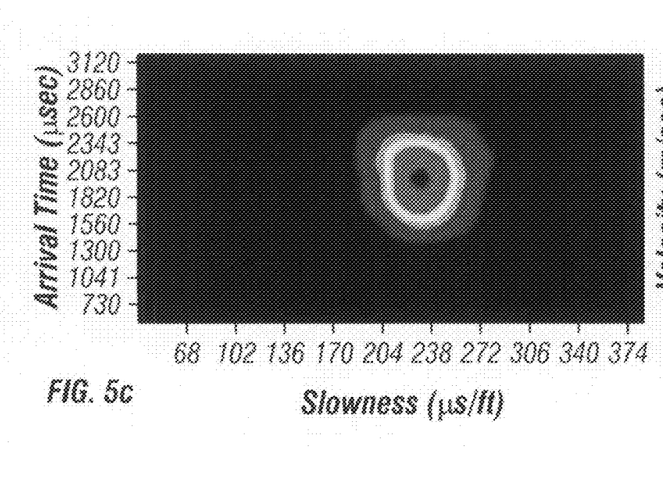
Figure 5D:
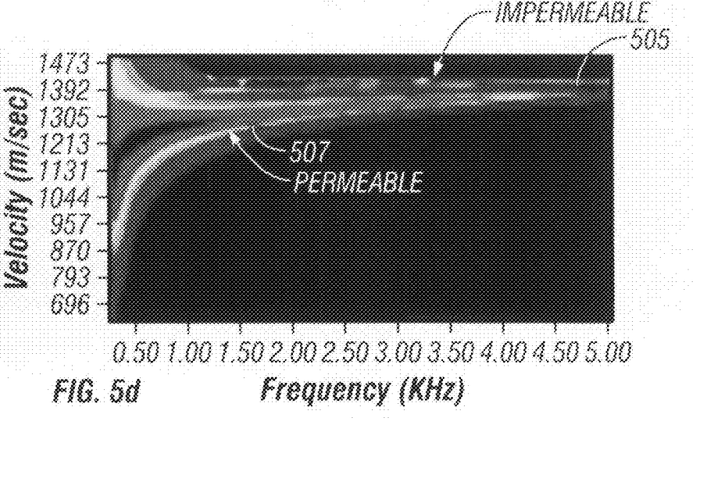

FIG. 5 shows FIGS. 5a, 5b, 5c and 5d show the modeling result for the permeable borehole condition. The permeable formation significantly attenuates the Stoneley wave amplitude. Because of the attenuation of the Stoneley wave 503, the small-amplitude shear waves 501, which were hidden in FIG. 4a, can now be seen in FIG. 5a. In the presence of the attenuation, the high-frequency portion of the wave is attenuated more than the low-frequency portion, resulting in the shift of the center frequency of the wave spectra. This center frequency 509 in FIG. 5b is clearly seen to be shifted from the center frequency 405 in FIG. 4b. The Stoneley wave velocity is also significantly affected by permeability. The slowness from the STC analysis (FIG. 5c) is increased from its impermeable counterpart (FIG. 4c). Also shown in FIG. 4d, the velocity dispersion curve 507 falls significantly below its impermeable counterpart (505, as picked from the VFC result in FIG. 4d), resulting in the delay of the wave's travel time relative to the impermeable condition. The modeling results for the wireline scenario demonstrate that the permeability-induced Stoneley wave attenuation and dispersion are two useful wave attributes that can be used to measure permeability. These attributes can be respectively measured by the shift of the wave's frequency content and by the delay in Stoneley wave travel time. In fact, the Stoneley wave frequency shift and travel time delay are jointly used in estimating formation permeability with wireline measurements (Tang and Patterson, 2004), and U.S. Pat. No. 5,784,333 to Tang et al., having the same assignee as the present disclosure and the contents of which are incorporated herein by reference.

Figures 6A, 6C:
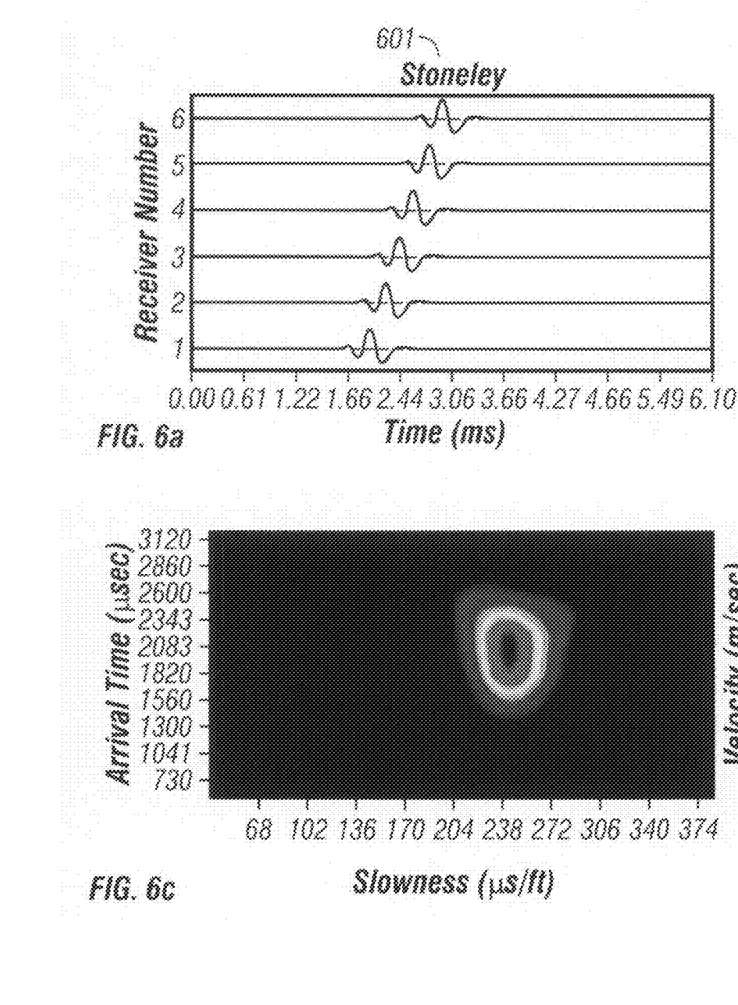
FIGS. 6a, 6b, 6c and 6d show simulated LWD array monopole-wave data for a 3-kHz source for an impermeable formation. The four plots of this figure show, respectively: (a) 3-kHz Stoneley wave; (b) wave spectrum; (c) semblance correlogram contour from the STC processing; and (d) velocity-frequency-coherence display from the dispersion analysis of the wave.
Figure 6B:
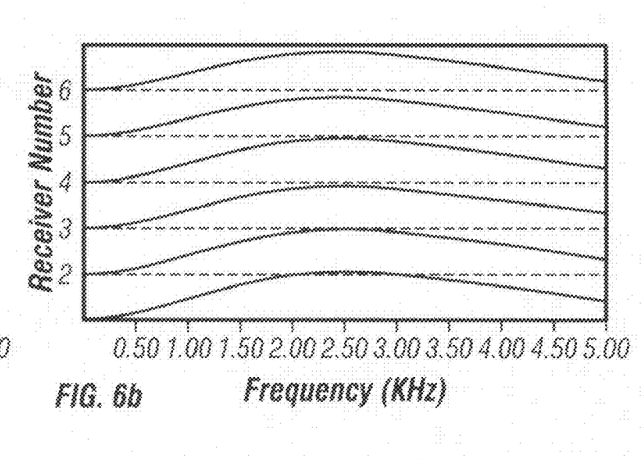
Figure 6D:
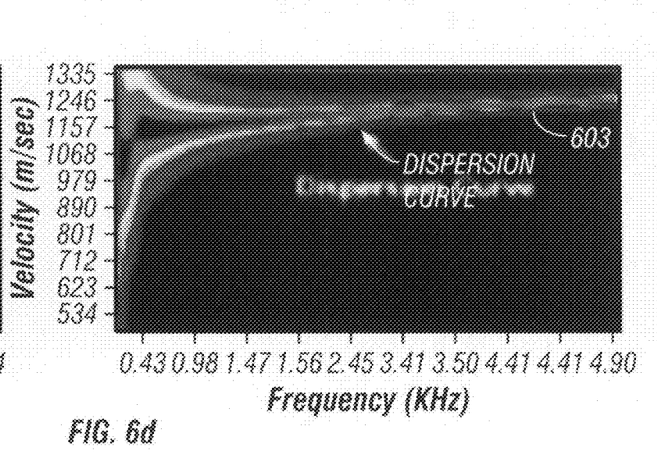

Similar to the wireline modeling, the LWD modeling includes the impermeable and permeable scenarios. FIGS. 6a, 6b, 6c and 6d show the impermeable case, corresponding to its wireline counterpart in FIG. 4. The modeled waveform in FIG. 6a shows mainly the Stoneley wave 601 for the 0-5 kHz frequency range (see wave spectrum in FIG. 6b). The presence of the LWD tool, however, substantially increases the wave's slowness (FIG. 6c), and lowers the wave's velocity dispersion curve 603 in FIG. 6d as compared to the wireline scenario of FIG. 4. In contrast to the wireline case where tool size is small, the presence of an LWD tool replaces a large portion of the borehole fluid. Consequently, the Stoneley wave propagating in the remaining fluid annulus becomes quite sensitive to the formation elastic property. For the same reason, this enhancement of sensitivity also applies to permeable porous formations. That is, relative to the wireline situation, the Stoneley-wave's sensitivity to permeability will be substantially enhanced in the LWD situation.

FIGS. 7a, 7b, 7c and 7d show the modeling result for the permeable borehole condition. The permeable formation substantially attenuates the Stoneley wave 701 amplitude. Because of the attenuation of the Stoneley wave, the small-amplitude arrivals, which were hidden in FIG. 6a, can now be seen in FIG. 7a. These arrivals, according to their arriving sequence, are tool and formation P waves 711, formation shear wave 713, and the Stoneley wave in the inner-tool fluid channel 715 (Tang et al., 2003). For the present analyses, we focus only on the Stoneley wave 701 in the fluid annulus between tool and formation. The large attenuation of the Stoneley wave shifts the wave's frequency content to an even lower frequency range 709, as compared its wireline counterpart 509 of FIG. 5b. The Stoneley wave slowness/velocity is even more significantly affected by permeability. The slowness from the STC analysis (705 in FIG. 7c) is substantially increased from its impermeable counterpart (703 in FIG. 7c, 603 in FIG. 6c). Also shown in FIG. 7d, the velocity dispersion curve falls 707 substantially below its impermeable counterpart (solid line 705, as picked from the VFC result in FIG. 6d). Compared with its wireline counterpart (FIG. 5d), this velocity decrease is more than doubled. The result in FIGS. 7a, 7b, 7c and 7d demonstrates that the presence of an LWD tool in borehole substantially increases Stoneley wave's sensitivity to formation permeability.

The results obtained by the above numerical modeling can be theoretically predicted by analytical solutions that account for the presence of a large-size LWD acoustic tool in the borehole. The Stoneley wavenumber for a permeable porous formation can be calculated (see Tang and Cheng 2004).

$$k = \sqrt{k_e^2 + \frac{2i\rho_{pf}\omega\kappa(\omega)R}{\eta(R^2 - a^2)} \sqrt{-i\omega/D + k_e^2} \frac{K_1\left(R\sqrt{-i\omega/D + k_e^2}\right)}{K_0\left(R\sqrt{-i\omega/D + k_e^2}\right)}} \quad (1)$$

where $\omega$ is the angular frequency, R and a are borehole and tool radii respectively, D is the dynamic pore fluid diffusivity given by Tang and Cheng, and $k(\omega)$ is dynamic permeability given by Johnson et al. (1987); $\rho_{pf}$ and $\eta$ are pore fluid density and viscosity respectively. $K_0$, and $K_1$ are modified Bessel functions of the second kind of orders zero and one respectively; $k_e$ is the Stoneley wavenumber for the impermeable porous formation (i.e., a sealed borehole wall), which, in the presence of an elastic logging tool is given by the solution of the following dispersion equation (Cheng et al., 1982):

$$\frac{I_0(fR) + E_{tool}K_0(fR)}{I_1(fR) + E_{tool}K_1(fR)} = \frac{f\rho}{l\rho_f} \left\{ \begin{array}{c} \frac{2gl}{k_s^2}\left[\frac{1}{gR} + \frac{2k_e^2}{k_s^2}\frac{K_0(gR)}{K_1(gR)}\right] - \\ \left[\frac{2k_e^2}{k_s^2} - 1\right]^2 \frac{K_0(lR)}{K_1(lR)} \end{array} \right\}, \quad (2)$$

Where $I_0$ and $I_1$ are modified Bessel functions of the first kind opposite orders zero and one respectively, $\rho_f$ and $\rho$ are borehole fluid and formation density respectively. The borehole fluid (f), formation compressional (l) and formation shear (g) radial wavenumbers are respectively given by:

$$f = \sqrt{k_e^2 - k_f^2} \; ; \; l = \sqrt{k_e^2 - k_p^2} \; ; \; g = \sqrt{k_e^2 - k_s^2} \; ;$$

with:

$$k_f = \frac{\omega}{v_f}; k_p = \frac{\omega}{v_p}; k_s = \frac{\omega}{v_s}$$

where the symbol v with subscripts f, p and s denoted the borehole fluid, formation compressional, and formation shear velocity respectively. The effect of the loffing tool is modeled by the parameter $E_{tool}$, expressed as the ratio of Bessel function combinations and parameters related to the elastic tool and the borehole fluid (Tang and Cheng):

$$E_{tool} = \frac{(M_T/a)fI_1(fa) + \rho_f\omega^2 I_0(fa)}{(M_T/a)fK_1(fa) - \rho_f\omega^2 K_0(fa)}, \quad (3)$$

where $M_T$ is an effective tool modulus accounting for the tool's elasticity, which can be calculated for the given tool property and dimensions (Tang and Cheng, 2004). With the Stoneley wavenumber given by eqn.(1) the Stoneley phase velocity ($V_{ST}$) and attenuation (inverse of quality factor Q) are calculated using:

$$V_{ST} = \omega / \Re(k)$$

$$Q^{-1} = 2\Im(k)/\Re(k) \quad (4),$$

where $\Re$ and $\Im$ denote taking the real and imaginary part of a complex function.

Figure 7A:
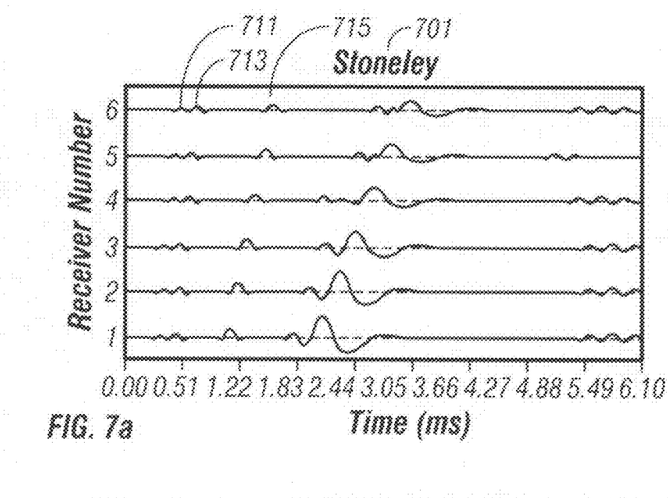
FIGS. 7a, 7b, 7c and 7d show results similar to FIGS. 6a, 6b, 6c and 6d for a permeable formation.
Figure 7B:
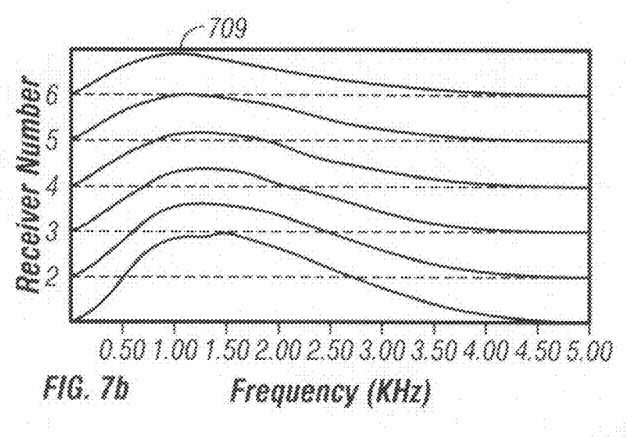
Figure 7C:
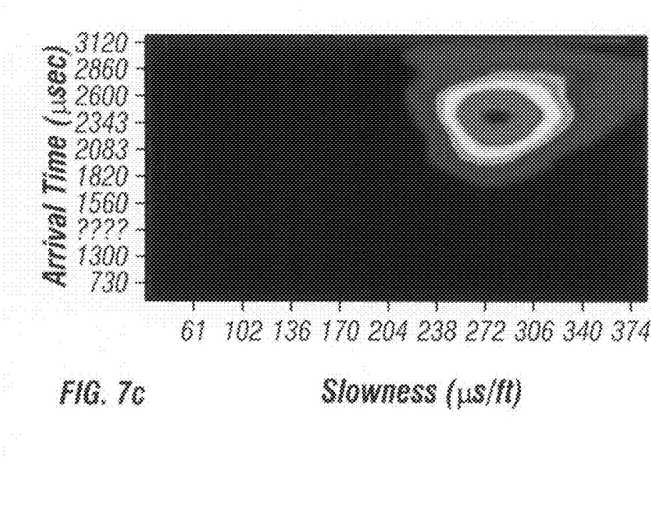
Figure 7D:
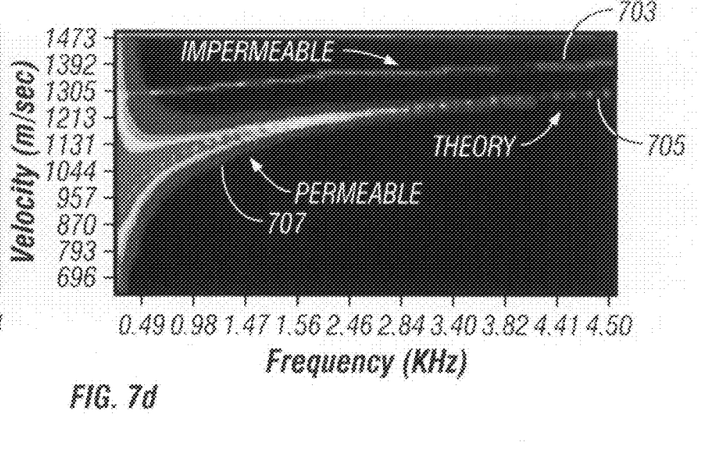

The result of the above analytical solution is plotted as 705 in FIG. 7d (dashed curve). The theoretical Stoneley wave phase velocity is calculated for the same acoustic model parameters in Table I. The predicted theoretical velocity dispersion curve agrees with the result from the VFC analysis of the synthetic waveform data. The theoretical solution can therefore be used as a forward model for estimating permeability from field Stoneley-wave data.

In the actual LWD environment, several influences on the acoustic measurements are always present and can cause difficulties for the Stoneley wave measurement. One major influence is the noise caused by drilling. The drilling environment is very demanding for acoustic measurements. Acoustic noises can be generated by various vibrations of the drill string in its axial, radial, lateral, and azimuthal directions. The tool position has complicated movements drilling, which, if not controlled, will impact the borehole to generate acoustic noises. For example, impacts of the drill string on the borehole, and the impact of the drill bit on the formation, generate strong drilling noises. A large portion of the drilling noise exists as "common modes" around the LWD tool. For example, the impact of the drill bit on the formation rock generates mainly tube waves to propagate along borehole. The tube wave is essentially the low-frequency Stoneley wave. Field measurements have shown that the frequency range for typical drilling noise is 0-3.5 kHz. Therefore the existence of drilling noise in the LWD acoustic data is one factor that affects the use of Stoneley waves for the LWD permeability measurement.

LWD tools are designed to minimize the effect of drilling noise. The tool design configuration, as shown in FIG. 2, can reduce the noise effect. For this configuration the direct acoustic waves (including Stoneley wave) from the source and the acoustic noise from the drill bit travel in opposite directions, preventing the drilling noise from adversely affecting the velocity analysis of the acoustic data. A recent development of the LWD technology is the enhancement of source transmitter power so as to enhance the signal-to-noise ratio in the low-frequency range (Tang et al., 2006).

Another feature of the LWD Stoneley wave measurement is the existence of tool waves that travel along the tool body. The acoustic isolator (FIG. 2) operates around or above 10 kHz and therefore can not attenuate the tool waves in the Stoneley-wave measurement frequency range of a few kilohertz. Fortunately, the tool waves travel very fast, almost at the plate velocity of steel (~5300 m/s), and therefore do not adversely affect the Stoneley-wave velocity analysis. However, because the two types of wave have similar frequency content, the tool waves, when strong, may affect the calculation of the Stoneley-wave attenuation using the frequency shift method.

Besides the drilling noise and tool wave effects, an off-centered tool position during drilling will adversely affect the permeability measurement using Stoneley waves. This effect is an essential factor that determines the validity of the measurement and will be discussed next.

Figure 8:
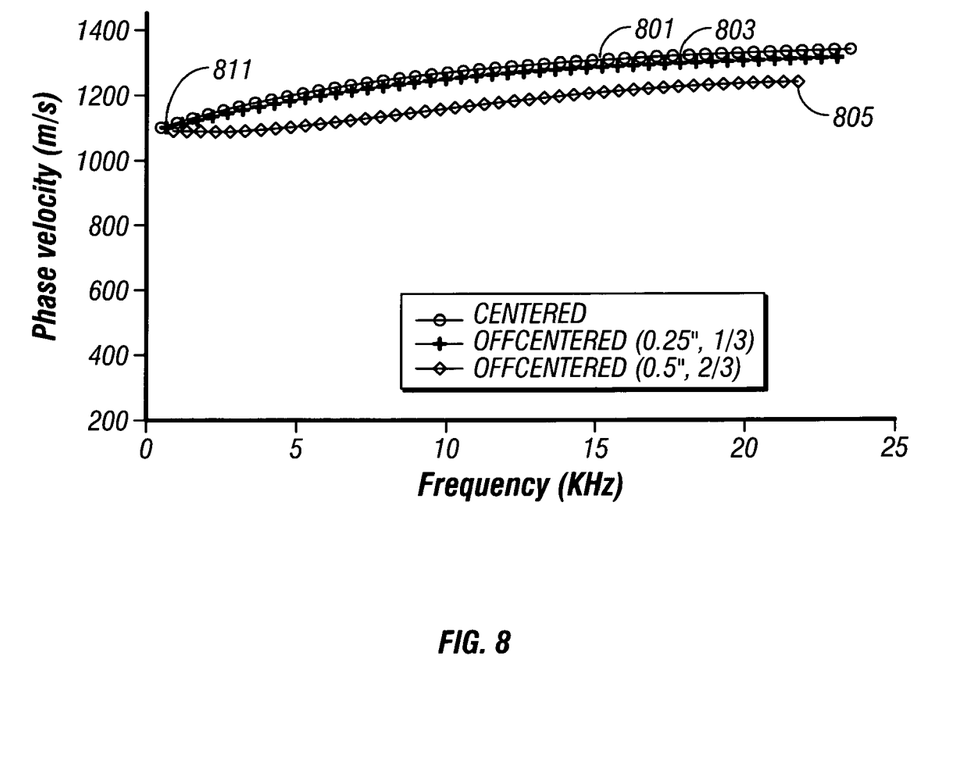
FIG. 8 shows the Stoneley wave phase velocities for a centered tool and an off-centered tool.

The presence of an LWD acoustic tool replaces a large portion the fluid volume in the borehole, making the Stoneley wave in the remaining fluid annulus quite sensitive to the tool position in the borehole. That is, an off-centered tool reduces the Stoneley wave velocity, masking the effect of formation permeability. A numerical finite element modeling was done to simulate Stoneley wave response for an off-centered LWD tool (Zheng et al., 2004). An example of the modeling result is shown in FIG. 8 for two off-center positions. For a fluid annulus of 0.75-in thickness, the tool off-centered by 0.25 in (⅓ of the annulus thickness) appreciably decreases the Stoneley velocity 803 relative to the centered tool result 801 in the frequency range above 1 kHz; a severely decentralized tool (off-centered by 0.5 in, ⅔ of the annulus thickness) substantially reduces 805 the Stoneley velocity. For a decentralized tool in the LWD measurement, it is difficult to distinguish whether the Stoneley velocity reduction is caused by tool decentralization or caused by formation permeability. Although the Stoneley velocity in the low-frequency limit is independent of tool position (as shown by 811 in FIG. 8 and also theoretically proved by Norris (1990)), a low-frequency measurement (below 1 kHz) is prone to strong drilling noise contamination and is presently not considered. A solution in the present disclosure is focused on maintaining the tool position from severe decentralization during drilling.

A hardware solution for the tool decentralization problem is using stabilizers mounted at the two ends of the LWD acoustic tool, as illustrated in FIG. 3. The radial dimension of the stabilizer is comparable to the drill bit size that controls the borehole diameter. The stabilizers have two functionalities that help the LWD acoustic measurement. The first and most important functionality is maintaining the tool position to avoid severe tool decentralization during the LWD measurement. With a centered (or approximately centered) tool, the measured Stoneley wave attributes, e.g., travel-time delay and frequency shift, can then be related to formation permeability. The second functionality is keeping the tool from impacting the borehole to avoid the generation of acoustic noises. LWD measurement practices show that data from tools mounted with stabilizers generally have less noise contamination compared to those without stabilizers.

As demonstrated from previous modeling, permeability relates to two important attributes of Stoneley waves: travel-time delay and frequency shift. In LWD, the large-size tool makes these attributes accentuated. Further, because the attributes are related to permeability, the correlation/correspondence between them provides a permeability indication (Tang and Cheng, 2004). Using the Stoneley wave attributes, one can design a method to characterize/indicate permeable formation intervals even while the well is being drilled.

Specifically in the LWD data acquisition, we perform a low-frequency monopole measurement to acquire Stoneley wave data in the 0.2-10 kHz frequency range. The Stoneley wave data can be processed downhole to compute Stoneley wave slowness and center frequency. The real-time data can be transmitted to the surface via existing technology (e.g., mud pulse). Using compressional and shear velocity and density obtained from LWD measurements, together with known drilling fluid properties and borehole/tool dimensions, we can calculate the impermeable Stoneley slowness/center-frequency and use them to compare with the measured values. The compressional and shear velocity and density may be obtained by suitable formation evaluation sensors on the bottom hole assembly. This comparison determines the travel-time delay and frequency shift parameters that relate to formation permeability. Depth intervals with significant time-delay and frequency-shift values that correlate/correspond to each other can then be characterized as permeable formations (Tang and Cheng, 2004).

In the permeability estimation, the Stoneley-wave travel time across the receiver array, as calculated from the measured slowness, is compared with the theoretical travel time value of an impermeable formation. The measured Stoneley-wave spectrum is also compared with a modeled wave spectrum for the impermeable case. The comparison yields the travel time delay and frequency shift of the measured data relative to the modeled (impermeable) data across the receiver array. The correlation between the time-delay and frequency-shift data indicates the permeability effects. The two data sets are then simultaneously fitted by using the model theory (e.g., equations (1)-(4)) to calculate the wave attributes for the measurement frequency range. The actual results of the above-described processing procedure are demonstrated using a field data example, to be discussed below.

Figure 9:
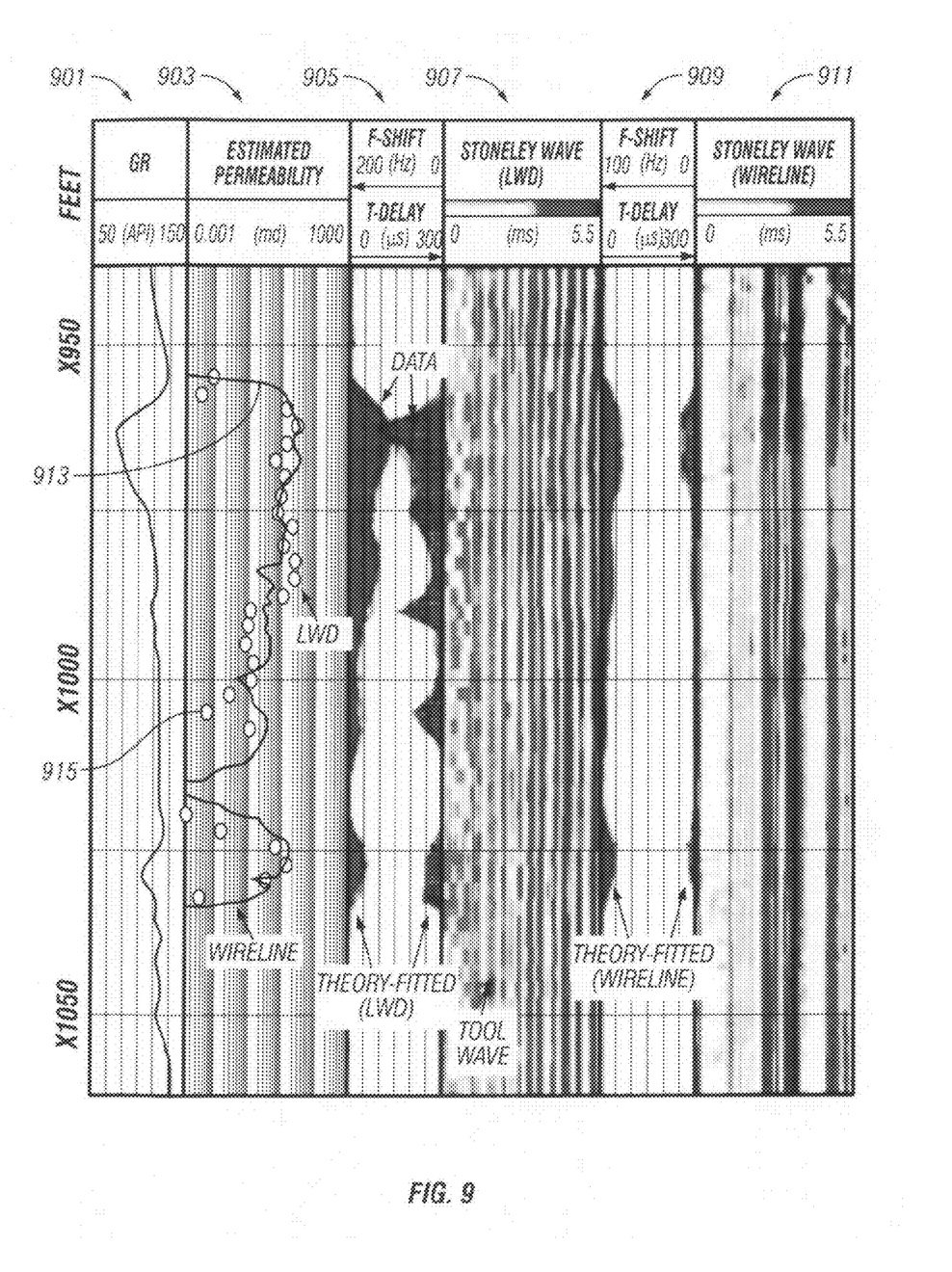
FIG. 9 shows exemplary data and processing results from a well.

To demonstrate the validity of the modeling/theoretical results and the feasibility of LWD permeability measurement, we analyze both the LWD and wireline Stoneley wave data sets acquired from a well. The LWD data was acquired by a 9.5-in tool (mounted with stabilizers) in a 12.25-in well. After drilling the well, a wireline acoustic tool was used to acquire the Stoneley wave data from the same well. FIG. 9 shows the raw LWD (track 4, 907) and wireline (track 6, 911) Stoneley wave data across two permeable sand formation intervals in the well (see Gamma-ray log curve in track 1 901). The early portion of the LWD wave data with an invariant arrival time, as indicated in track 4, is the low-frequency tool wave. The later portion belongs to the Stoneley wave with a center frequency around 4 kHz. The wireline data (track 6) shows two frequency components, one around 1 kHz and the other around 3-4 kHz. The wireline data is low-pass filtered to maximize the 1 kHz component for the processing.

Using the available compressional, shear, and density log data for the interval (not shown) we obtain the Stoneley-wave travel time delay and frequency shift data for the LWD (track 3,905) and wireline (track 5,909). Two observations can be made for the LWD and wireline results. The first is that the time-delay and frequency-shift data are well correlated for both LWD and wireline scenarios, corresponding to the same permeable intervals of the formation. The second is that the LWD time delay and frequency shift values are much higher that their wireline counterpart. Although it is not straightforward to compare the frequency shift data due to different frequency ranges used to process the LWD (around 3-4 kHz) and wireline (around 1 kHz) wave data, the time-delay data can be quantitatively compared. On the average, the LWD time-delay value is about twice higher than its wireline counterpart. This enhanced LWD Stoneley-wave permeability response due to large tool size, as compared to the wireline situation, is well predicted by the theoretical modeling shown in FIGS. 7*a*, 7*b*, 7*c* and 7*d*. The theoretical analysis results are thus validated by the field data.

Formation permeability values are independently estimated from the LWD and wireline data by simultaneously fitting their time-delay and frequency-shift data using the model theory (i.e., eqns (1)-(4)) above. The theoretical fitting curves are respectively indicated in tracks (3) and (5). The estimated permeability values are compared in track 2. Despite very different tool size and processing frequency range for the LWD and wireline data, the estimated LWD 915 and wireline 913 permeability values compare quite well. This indicates the model theory can correctly accommodate the effects of frequency and tool dimension. This field data comparison example demonstrates the feasibility of permeability measurement using LWD Stoneley-wave data.

It should be noted that while the example shown depicted the transmitter assembly and the receiver assembly on a single tubular, this is not to be construed as a limitation of the disclosure. It is also possible to have a segmented acoustic logging tool to facilitate conveyance in the borehole.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation permeabilities may be recorded on a suitable medium and used for subsequent processing upon retrieval of the BHA. The determined formation permeabilities may further be telemetered uphole for display and analysis.

The foregoing description is directed to particular embodiments of the present disclosure for the purpose of illustration and explanation. It will be apparent, however, to one skilled in the art that many modifications and changes to the embodiment set forth above are possible without departing from the scope and the spirit of the disclosure. It is intended that the following claims be interpreted to embrace all such modifications and changes.

What is claimed is:

1. An apparatus for determining a permeability of an earth formation, the apparatus comprising:
   (a) a logging tool configured to be conveyed in a borehole on a drilling tubular;
   (b) an acoustic transmitter on the logging tool configured to generate a Stoneley wave in an annulus between the logging tool and a wall of the borehole;
   (c) an array of acoustic receivers configured to generate signals responsive to be generated Stoneley wave; and
   (d) a processor configured to:
      (A) process the generated signals using a model derived from a formation compressional wave velocity, a formation shear wave velocity and a formation density to estimate the permeability of the earth formation; and
      (B) record the estimated permeability on a suitable medium.

2. The apparatus of claim 1 further comprising a first stabilizer at a first end of the logging tool and a second stabilizer at a second end of the logging tool, the first and second stabilizers configured to maintain the logging tool in a substantially centralized position in the borehole during rotation of the drilling tubular.

3. The apparatus of claim 1 wherein the acoustic transmitter is configured operate in a monopole mode at a frequency of between about 0.2 kHz and 10 kHz.

4. The apparatus of claim 1 wherein the processor is configured to estimate the permeability by further determining a value of the formation permeability in the model which produces at least one of:
   (i) a Stoneley wave spectrum which substantially matches a Stoneley wave spectrum derived from the signals; and
   (ii) a Stoneley wave that has a time delay which substantially matches a Stoneley wave time delay derived from the signals.

5. The apparatus of claim 1 wherein the processor is further configured to:
   (i) estimate a frequency shift of the generated Stoneley wave relative to an output of the model with zero permeability; and
   (ii) record the estimated frequency shift on a suitable medium.

6. The apparatus of claim 1 wherein the processor is further configured to:
(i) estimate a time delay of the generated Stoneley wave relative to an output of the model with zero permeability; and
(ii) record the estimated time delay on a suitable medium.

7. The apparatus of claim 1 wherein the processor is configured to estimate the permeability by performing at least one of: (i) a slowness-time-coherence analysis, and (ii) a velocity-frequency-coherence analysis.

8. The apparatus of claim 1 further comprising an acoustic isolator configured to attenuate an acoustic signal propagating along a body of the logging tool.

9. The apparatus of claim 1 further comprising at least one formation evaluation sensor configured to determine (i) the formation compressional wave velocity, (ii) the formation shear velocity, and (iii) the formation density.

10. The apparatus of claim 1 wherein the array of receivers is positioned between the transmitter and a drillbit.

11. A method of determining a permeability of an earth formation, the method comprising:
(a) conveying a logging tool in a borehole on a drilling tubular;
(b) activating an acoustic transmitter and generating a Stoneley wave in an annulus between the logging tool and a wall of the borehole;
(c) using an array of acoustic receivers to generate signals responsive to be generated Stoneley wave;
(d) processing the generated signals using a model derived from a formation compressional wave velocity, a formation shear wave velocity and a formation density to estimate a permeability of the earth formation; and
(e) recording the estimated permeability on a suitable medium.

12. The method of claim 11 further comprising maintaining the logging tool in a substantially centralized position in the borehole during rotation of the drilling tubular.

13. The method of claim 11 further comprising operating the acoustic transmitter in a monopole mode at a frequency of between about 0.5 kHz and 10 kHz.

14. The method of claim 11 further comprising estimating the permeability by further determining a value of the formation permeability in the model which produces at least one of:
(i) a Stoneley wave spectrum which substantially matches a Stoneley wave spectrum derived from the signals; and
(ii) a Stoneley wave that has a time delay which substantially matches a Stoneley wave time delay derived from the signals.

15. The method of claim 11 further comprising:
(i) estimating a frequency shift of the generated Stoneley wave relative to an output of the model with zero permeability.

16. The method of claim 11 further comprising:
(i) estimating a time delay of the generated Stoneley wave relative to an output of the model with zero permeability.

17. The method of claim 11 further comprising estimating the permeability by performing at least one of: (i) a slowness-time-coherence analysis, and (ii) a velocity-frequency-coherence analysis.

18. The method of claim 11 further comprising using an acoustic isolator to attenuate an acoustic signal propagating along a body of the logging tool.

19. The method of claim 11 further comprising determining (i) the formation compressional wave velocity, (ii) the formation shear velocity, and (iii) the formation density.

20. The method of claim 11 further comprising estimating the permeability by using a relationship of the form:

$$k = \sqrt{k_e^2 + \frac{2i\rho_{pf}\omega\kappa(\omega)R}{\eta(R^2 - a^2)} \sqrt{-i\omega/D + k_v^2} \frac{K_i\left(R\sqrt{-i\omega/D + k_e^2}\right)}{K_\theta\left(R\sqrt{-i\omega/D + k_e^2}\right)}}$$

where $\omega$ is the angular frequency, R and a are borehole and tool radii respectively, D is a dynamic pore fluid diffusivity, and $k(\omega)$ is dynamic permeability; $\rho_{pf}$ and $\eta$ are pore fluid density and viscosity respectively; $K_0$ and $K_1$ are modified Bessel functions of the second kind of orders zero and one respectively; and $k_e$ is the Stoneley wavenumber for the impermeable porous formation.

21. A computer readable medium for use with n apparatus for determining a permeability of an earth formation, the apparatus comprising:
(a) a logging tool configured to be conveyed in a borehole on a drilling tubular;
(b) an acoustic transmitter configured to generate a Stoneley wave in an annulus between the logging tool and a wall of the borehole; and
(c) an array of acoustic receivers configured to generate signals responsive to be generated Stoneley wave;
the medium comprising instructions which enable a processor to:
(d) process the generated signals using a model derived from a formation compressional wave velocity, a formation shear wave velocity and a formation density to estimate a permeability of the earth formation; and
(e) record the estimated permeability on a suitable medium.

22. The medium of claim 21 further comprising at least one of (i) a ROM, (ii) an EPROM, (iii) an EAROM, (iv) a flash memory, and (v) an optical disk.

* * * * *